United States Patent [19]

Sireix

[11] 4,353,764

[45] Oct. 12, 1982

[54] PROCESS OF FORMING PROFILES ESPECIALLY TUBULAR PROFILES

[76] Inventor: Georges Sireix, 9, Rue Saint-Marc, 68400 Riedisheim (Haut-Rhin), France

[21] Appl. No.: 241,529

[22] Filed: Mar. 9, 1981

[30] Foreign Application Priority Data

Mar. 11, 1980 [FR] France ............................... 80 05684

[51] Int. Cl.³ ........................................... B29D 23/10
[52] U.S. Cl. ................................... 156/203; 156/217; 156/218; 493/302
[58] Field of Search ............... 156/203, 466, 217, 218; 493/302

[56] References Cited

U.S. PATENT DOCUMENTS 3,323,964 12/1967 Young .............................. 156/203
3,777,632 12/1973 Pepmeier ....................... 156/203 X

FOREIGN PATENT DOCUMENTS 792517 8/1968 Canada ............................... 156/203

Primary Examiner—David A. Simmons
Attorney, Agent, or Firm—Robert E. Burns; Emmanuel J. Lobato; Bruce L. Adams

[57] ABSTRACT

The invention relates to a process of forming profiles, especially tubular profiles obtained by gluing a plurality of bands of fibrous, cellulosic, metallic, plastic and other materials offset laterally relative to one another and being initially joined in an area of small width, the area of joining then being extended by a helicoidal progression to the entire perimeter of the tubular profile.

7 Claims, 9 Drawing Figures

PROCESS OF FORMING PROFILES ESPECIALLY TUBULAR PROFILES

There is already known by U.S. Pat. No. 2,256,263 and by French Pat. No. 77.04994 (published under U.S. Pat. No. 2,380,129) a process of forming closed and/or open profiles consisting of a plurality of layers of material in fibrous, cellulosic, metallic or plastic bands. According to this process one takes a plurality of reels of material in band form of which the width of each band is increased as a function of the thickness of the material used. Each band is offset laterally relative to the adjacent band. Owing to this, the lateral edges of the different bands present in cross section the form of a flight of stairs. The different bands are coated with glue and are assembled to constitute the core of the profile. This core is then submitted to a forming operation by bending in the manner that the lateral edges of each band are brought into abutment with one another. By reason of the fact that the different bands are offset relative to one another, the joints between their lateral edges are consequently offset which reduces the risk of longitudinal opening of the tubular profile produced.

There are likewise known through British Pat. No. 782,570 a process, machine and interior pressure mold for making discontinuously the flanks of boxes etc., with sheets of wood veneer or other fibrous material. A piece formed of two or more sheets of veneer covered with glue or artificial resin are placed on an exterior mold. By means of jacks acting on the exterior mold, the piece is bent around an interior mold. Then the piece is submitted to pressure on all of its faces until the glue or more adhesive plastic material has hardened.

However, these processes present several disadvantages and in particular there are created in the tubular profile produced according to the process different tensions acting on the band. In fact, in applying and in gluing the different bands on all of their width there is obtained a compact band of a thickness corresponding to the sum of the thicknesses of the different bands. The length of the circumference and/or the length of the perimeter of the tubular profile is different for the inner face than for the outer face. Thus in the forming procedure the inner face is submitted to a creasing effect and the outer face is submitted to tension. By reason of this, there is a risk of the abutting joint of the lateral edges of the outer band opening in particular when the tension is greater than the strength of the glue joint. Moreover, the creasing of the inner face can not only detract from the asthetic appearance of the tubular profile when used for packaging, but likewise involves technical disadvantages especially when the inner band is relied on to render the package fluid-tight. In fact, the bumps due to crinkling can present air pockets or hollow pockets and the continuing risk of tearing open the pockets.

An object of the present invention is to remedy these disadvantages. The invention as characterized in the claims solves the problem by making a continuous tubular profile obtained by gluing together a plurality of bands of fibrous, cellulosic, metallic, plastic or other material, the different bands previously coated with glue on at least one of their faces being laterally offset relative to one another and being initially joined in an area of small width, the area of joining then being extended by a helicoidal progression to the entire perimeter of the tubular profile.

The advantages obtained by virtue of this invention consist essentially in that the outer band is not submitted to a tension different from that of the other bands and the risk of tearing is suppressed.

Besides the inner band is likewise submitted to the same tension as the other bands and wrinkling of the inner band is avoided, wrinkling which may cause separation of the inner band from the other bands.

The invention is disclosed below in more detail with the aid of drawings representing only some modes of execution.

The process according to the invention relates to the fabrication of a continuous tubular profile from bands of fibrous, cellulosic, metallic, plastic or other material continuously unwinding from reels of which the number is a function of the number of bands and, after traversing vats of adhesive, are continuously assembled in order to obtain the final tubular profile.

Figure 1:
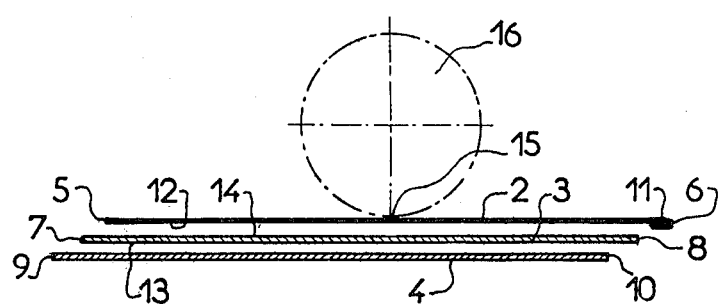
FIGS. 1 to 3 are schematic views illustrating the different phases of forming a tubular profile having a circular cross section.
Figure 2:
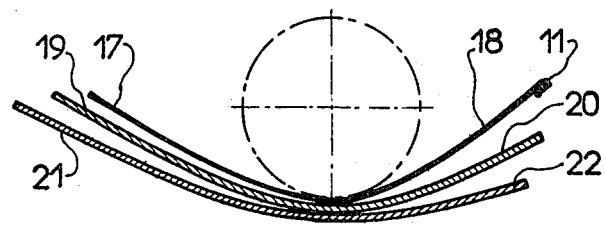
Figure 3:
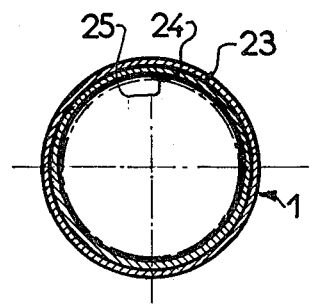
Figure 4:
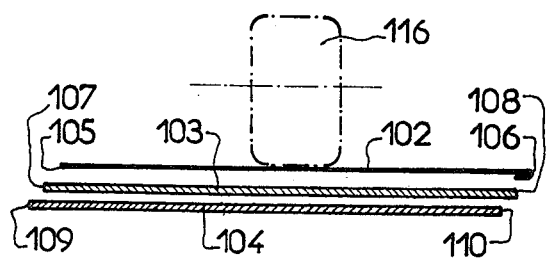
FIGS. 4 to 9 are schematic views illustrating the different phases of forming a tubular profile of rectangular cross section.
Figure 5:
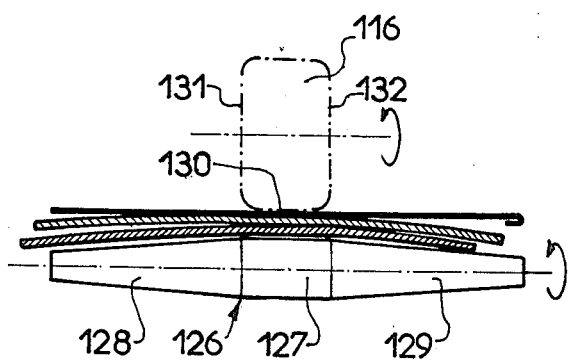
Figure 6:
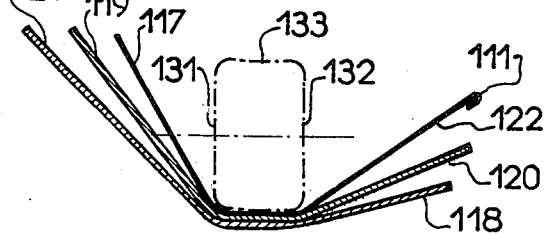

Reference is made to FIGS. 1 to 3.

By way of nonlimiting example, the tubular profile 1 of circular cross section is constituted by bands 2, 3, 4 of fibrous, cellulosic, metallic or plastic material. According to this example, the band 2 is of plastic material while the two other bands 3, 4 are of fibrous material. The lateral edges 5, 6 of the band 2 are shifted laterally relative to the lateral edges 7, 8 of the band 3. The latter are likewise shifted relative to the lateral edges 9, 10 of the band 4. By reason of this, the lateral edges 5, 7 and 9 present the form of a staircase when viewed in cross section. The band of plastic material 2 is provided on one of its lateral edges 6 with a border 11 permitting the welding together of the two lateral edges 5 and 6.

Before the formation at least one of the faces 12, 13 of the bands 3, 4 is coated with adhesive. According to a variant, both faces 13, 14 of the intermediate band 3 are coated with adhesive. Thus when the number of bands is odd, the two faces of each even band can be coated.

The assembly of bands 2, 3, 4 advances along a generatrix 15 of a mandrel 16. A certain pressure is exerted along this generatrix 15 such that the bands 2, 3, 4 are bonded together in an area of narrow width. However, the extremetries 17, 18; 19, 20; 21, 22 of the bands 2, 3, 4 are not bonded.

After this partial bonding, the different bands 2, 3, 4 are directed to a forming device laterally extending the zone of joining to the entire perimeter of the tubular profile 1 that is to be produced.

By reason of the combination on the one hand of the extension of the width of bonding and on the other hand of the continual advance of the assembly of bands 2, 3, 4, where is obtained a helicoidal progression of the width of the bonding. In the course of this helicoidal progression of the bonding, the extremeties 17, 18, 19, 20, 21, 22 of the bands 2, 3, 4 can extend laterally before the final bonding which permits avoiding on the one hand the outer band 4 being submitted to a tension greater than the band 3 and on the other hand the inner band 2 being rumpled.

The gluing of these extremeties 17 to 21 can be done only during passage of the different bands 2, 3, 4 through the forming device of the tubular profile 1.

Before the final junction of the lateral edges 7 to 10, the two lateral edges 5, 6 of the band of plastic material 2 are soldered if the profile is so prepared, otherwise they are simply glued.

The width of the bands 2 to 4 is such that after formation of the tubular profile 1 and in spite of the spreading of the extremeties 17 to 22 the two lateral edges of each band 2, 3, 4 abut.

By reason of the offsetting of each band, the joints 23, 24, 25 are likewise offset which avoids untimely opening of the tubular profile after its formation.

Reference is made to FIGS. 4 to 9.

For production of a tubular profile 101 of rectangular cross section, 3 bands 102, 103, 104 can likewise be used. The lateral edges 105, 106, 107, 108, 109 and 110 are likewise offset relative to one another.

After the bands 102, 103, 104 have been coated with glue, the bands 102, 103, 104 are introduced between a mandrel 116 and a roller 126. The mandrel 116 has a cross section identical with that of the tubular profile 101 that is to be produced. The roller 126 is composed of a cylindrical part 127 by joining two frustoconical parts 128, 129. By reason of this, the gluing of bands 102, 103, 104 is effected only in a narrow width, a width corresponding on the one hand to the lower edge 130 of the mandrel 116 and, on the other hand, to the width of the cylindrical part 127 of the roller 126 (see FIG. 5). The extremeties 117 to 122 of the bands 102 to 104 are then applied against the vertical sides 131, 132 of the mandrel 116, these vertical sides 131, 132 being placed adjacent the lower edge 130. In the case of a polygonal section of "n" sides, the simultaneous gluing of the extremeties 117 to 122 is continued until all of the places are covered except for the last surface 133 which is maintained bare. Of course the edges 105 to 110 of the bands 102 to 104 project a certain distance beyond the upper face 133 of the mandrel 116 (see FIG. 6).

Figure 7:
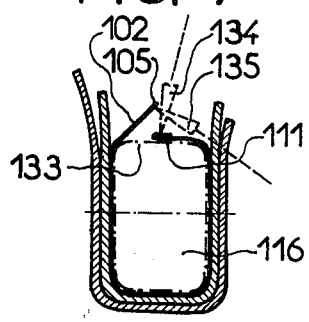

As seen in FIG. 7, the edge 111 of the band 102 is preheated by an appropriate nozzle 134, and then by a second nozzle 135 placed downstream of the nozzle 134 with reference to the direction of advance of the tubular profile 101, the lateral edge 105 of the band 102 is likewise heated which permits the welding of the band 102.

Figure 8:
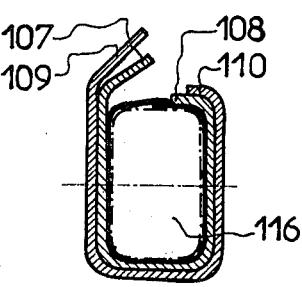
Figure 9:
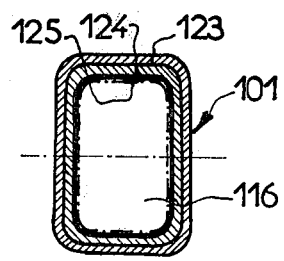

Then, as indicated in FIG. 8, the glue coated edges 108, 110 are joined and finally the edges 107, 109 are joined to obtain the tubular profile 101. Likewise, according to this embodiment the joints 123, 124, 125 are staggered.

Thus the progressive helicoidal joining of the bands 102, 103, 104 is broken up into segments in which the number is a function of the number of the sides of the tubular profile of polygonal cross section 101.

I claim:

1. Process of forming a tubular profile by gluing together a plurality of bands of fibrous, cellulosic, metallic, plastic or other flexible material, comprising the steps of:

superposing a plurality of said bands, previously coated with adhesive on at least one face, with said bands offset laterally relative to one another so that their side edges are stepped, initially bonding said superposed bands together only in an area of narrow width intermediate their side edges, progressively bending said superposed bands into tubular form around a mandrel and concurrently progressively increasing the width of the area in which said bands are bonded while advancing said superposed bands in a lengthwise direction, the progressive bending of said bands and the lateral spreading of said area of bonding of said bands proceeding in a helicoidal manner until the area in which said bands are bonded has extended to lateral edges of said bands as said lateral edges are brought together, and joining offset lateral edges of said superposed bands to complete the formation of said tubular profile.

2. Process according to claim 1 for making a tubular profile of circular cross section, in which said mandrel is of circular cross section and said narrow area in which said bands are initially bonded corresponds with a generatrix of said mandrel.

3. Process according to claim 1 for making a tubular profile of polygonal cross section, in which said mandrel is of polygonal cross section and the width of said narrow area of the initial bonding of said bands corresponds to the width of one side of said mandrel.

4. Process according to claim 3, in which a roller presses said bands against said one side of said mandrel to effect the initial bonding of said bands in said narrow area.

5. Process according to claim 1, in which lateral edges at one side of said bands are pressed against the mandrel and bonded with one another before lateral edges at the opposite side of said bands are pressed against the mandrel and bonded with one another and with said lateral edges at said one side of said bands.

6. A process according to claim 1, in which said bands comprises an inner band of thermoplastic material and in which opposite side edges of said inner band are joined with one another by heat-sealing prior to joining lateral edges of other of said bands.

7. A process according to claim 6, in which one side edge of said inner band is heated at a first location, the opposite side edge of said inner band is heated at a second location downstream of said first location, whereupon said side edges of said inner band are brought together and joined.

* * * * *